Feb. 21, 1933.                J. F. SEITZ                  1,898,905
              METHOD AND APPARATUS FOR MAKING MOTION PICTURES
                        Filed Dec. 15, 1927       5 Sheets-Sheet 1

Inventor
John F. Seitz
by Hazard and Miller
Attorneys

Feb. 21, 1933.  J. F. SEITZ  1,898,905
METHOD AND APPARATUS FOR MAKING MOTION PICTURES
Filed Dec. 15, 1927  5 Sheets-Sheet 2

Inventor
John F. Seitz
by Hazard and Miller
Attorneys

Feb. 21, 1933.  J. F. SEITZ  1,898,905
METHOD AND APPARATUS FOR MAKING MOTION PICTURES
Filed Dec. 15, 1927  5 Sheets-Sheet 4

Inventor
John F. Seitz
by Hazard and Miller
Attorneys

Patented Feb. 21, 1933

1,898,905

UNITED STATES PATENT OFFICE

JOHN F. SEITZ, OF LOS ANGELES, CALIFORNIA

METHOD AND APPARATUS FOR MAKING MOTION PICTURES

Application filed December 15, 1927. Serial No. 240,154.

My invention is a method and apparatus for making motion pictures which is designed to change much of the present wasteful and unsatisfactory manner of picture making and substitute for it a system that is economical, and, in its possibilities of reconstruction and rearrangement of the subject matter, almost unlimited.

By my method and apparatus I eliminate the present multiplication of effort, etc. on the part of actors, directors, cameramen and others on the set (either on location or in the studio) and transpose most of the work of making the motion picture to the laboratory, where it can be more intelligently and economically made. This elimination of the repetition of effort is accomplished by taking only the so-called long shot of the sequence with the camera, and from this long shot all necessary intermediate and close-up views, dissolves, various effects and moving shots are made.

Broadly, by my method the camera gives only a nucleus, that is, the irreducible minimum of the picture, and from this nucleus the consecutive picture story is built up and arranged in the manner desired.

In order to effect the method of my invention I construct a printing machine of special design that is capable of accomplishing most of the work now done by various cameras, special paraphernalia and equipment of different kinds that now are utilized and seem to be needed to make a complete picture. By my invention I may reproduce pictures either by photographing projected pictures on a translucent screen or a reflecting screen.

In my method of procedure and apparatus a picture, say of a long shot, which I designate as a basic picture, is projected by a projecting machine on a screen; then a camera is utilized to photograph part of the scene only, such as the principal actors, or the parts to be shown enlarged. To obtain the proper relative position, perspective, and so on, I preferably arrange the screen, the projector and the camera to be all relatively movable towards and from each other. The screen may also be tilted at various angles for certain desired effects and both the projector and the camera may be elevated and shifted transversely in regard to the screen.

In the procedure of taking the component parts of a consecutive picture from relatively long shots, I may project the motion picture of the long shot on the screen and at the same time move the screen away from the projector, which causes an enlargement of the picture projected, the focusing of the projector being regulated in accordance with the position of the screen. Then in consonance with this change of the individual parts or the depiction of the actors on the screen the camera may be moved either to or from the screen, being kept in focus on the parts or actors to be shown enlarged, and these may be followed by elevating, depressing and moving the camera laterally or by use of a free head feature of the camera. Various other manners of manipulation to secure the desired effects will appear as the description of my invention proceeds.

My invention will be more readily understood from the following description and drawings, in which:

Fig. 17 is a diagrammatic plan of a reflecting system of photography utilizing a camera and projector with the lens shiftable laterally in regard to the aperture plate.

Fig. 17—A is a front elevation of the camera.

Fig. 18 is a longitudinal section taken substantially on the line 18—18 of Fig. 20 of a variable focal lens such as may be used on the camera or projector or both, in the reflecting type of printer.

One type of apparatus which may be utilized is shown in Figs. 1 through 6 and is constructed substantially as follows: I utilize a bed frame designated generally by the numeral 11 supported in a suitable manner and this may be somewhat the same as a lathe frame having guide tracks 12 on each side. There is a longitudinally extending screw 13 on one side which has a train of gears in a gear box 14 with a speed changing mechanism 15 such as is common in lathe practice. The gear train is illustrated as being driven by an electric motor 16 through a drive belt 17. The screw 13 is journaled in the ordinary manner on the front of the bed.

A screen carriage 18 has a table 19 which is mounted on the guide track 12. This table has an apron 20 on the front, in which is mounted a clutch 21 of the half nut type operated by a handle 22 to turn a shaft 23, the half nut being mounted on a plate 24 connected to the shaft, this being a construction similar to that used in lathe practice to connect a table to the feed screw. By such construction the screen carriage may be moved longitudinally in either direction of the bed.

A screen 25 is mounted in a screen frame 26. This frame is illustrated as being pivoted on brackets 27 on a swivel plate 28 on the carriage 18. This swivel plate is pivoted on a pivot bolt 29 and may be clamped at any desired angle relative to the bed by clamp bolts 30 secured to the table and operating in a slot 31 in the swivel plate. To incline or tilt the screen I utilize arms 32 extending from the swivel plate and to these are pivotally connected links 33 having a pin and slot connection 34 with the side of the frame, the pin being clamped by a thumb nut 35. (Note particularly Figs. 1, 2 and 4.)

From the above description it will be seen that the screw 13 on the bed may be operated at any desired speed and that the carriage for the screen may be engaged or disengaged from the screw at will, by operation of the clutch 21 by the handle 22, this giving the screen a transverse motion lengthwise of the bed, and in addition the screen may be partly rotated, forming an angle with the bed by swiveling on the pivot 29, or it may be tilted or inclined either forwardly or rearwardly and clamped in position due to the pivotal mounting on the brackets 27 and held in position by the adjusting link 33.

Figure 1:
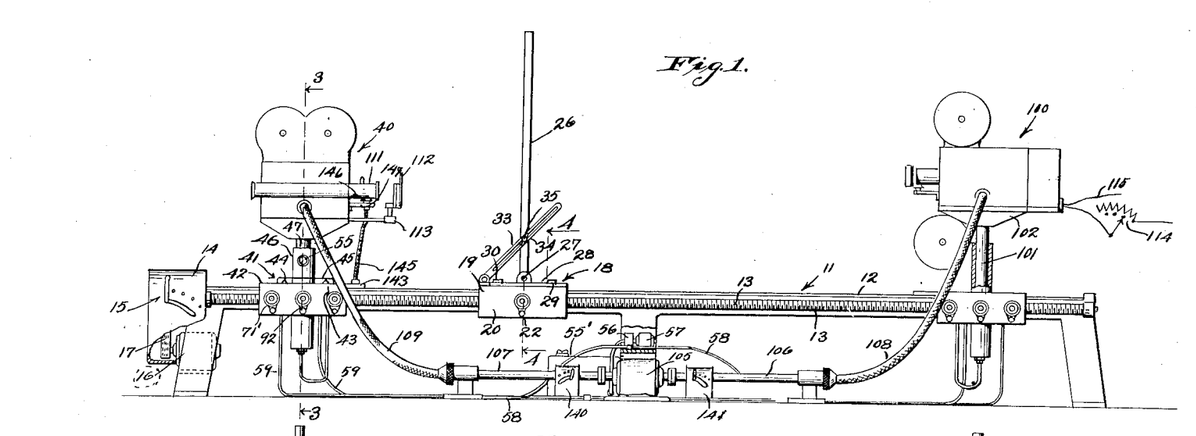
Figure 1 is a side elevation of apparatus which may be utilized in connection with my invention. This shows a projecting machine, a screen and a camera.
Figure 2:
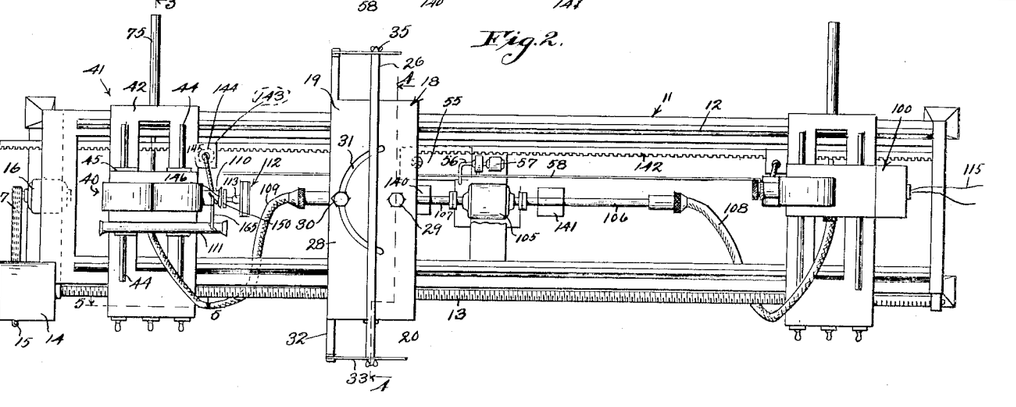
Fig. 2 is a plan of Fig. 1.
Figure 5:
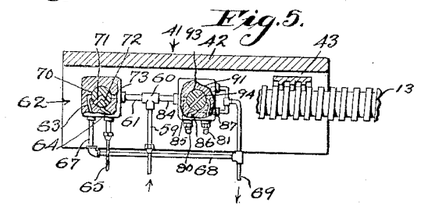
Fig. 5 is a detail section on the line 5—5 of Fig. 2 in the direction of the arrows, showing the hydraulic control mechanism.

A camera, designated generally by the numeral 40, is mounted on a camera carriage, designated generally by the numeral 41. (Note Figs. 1, 2 and 3.) This camera carriage has a table 42 which slides on the guide tracks 12 of the bed and has a clutch, designated generally by the numeral 43, similar to the clutch 21 of the screen carriage, which may be coupled to or disengaged from the screw 13 extending along the bed to shift the camera carriage longitudinally of such bed. In addition the camera table has cross guides 44. Mounted on the cross guides there is a cross head 45 which carries a cylinder 46 with a plunger 47 therein. On the top of the plunger the camera is mounted having a base 51, and it is intended that the camera thus be rigidly connected to the plunger. A set screw 55 in the cylinder 46 may be utilized to clamp the plunger 47 in any desired elevation. This plunger is hydraulically operated as follows:

A hydraulic fluid tank 55' is mounted in any suitable position and has a pump 56 connected therewith driven by an electric motor 57 (Figs. 1 and 2). From the pump and by means of a flexible conduit 58, the hydraulic fluid is taken to an inlet pipe 59 having a T 60 connected thereto with a branch 61, leading to a valve 62. This valve has ducts 63 and 64 therein, the duct 64 leading by a flexible conduit 65 to the base 66 of the cylinder 46. An outlet pipe 67 is connected to the duct 63 and by means of a branch 68 leads to a drain pipe 69, returning the fluid to the storage tank (Fig. 5). The valve has a valve plug 70 with right angular ports 71 and 72, and this plug is controlled by a hand lever 71' mounted on the apron 72' of the camera table 42. These ports 71 and 72 are adapted to register with the ducts 63 and 64 and with the duct 73 connecting to the pipe 61.

From such construction it will be seen that when the plug is turned so that the ports 71 and 72 register with the ducts 64 and 73 that the hydraulic fluid is forced to the cylinder and raises the plunger 47, thereby elevating the camera. When they are turned into the neutral position, as shown in Fig. 5, the plunger is held at a desired position, and in addition may be clamped by the set screw 55. When the valve plug is turned so that the ports 71 and 72 register with the ducts 63 and 64, the fluid is drained out of the cylinder 46.

Figure 3:
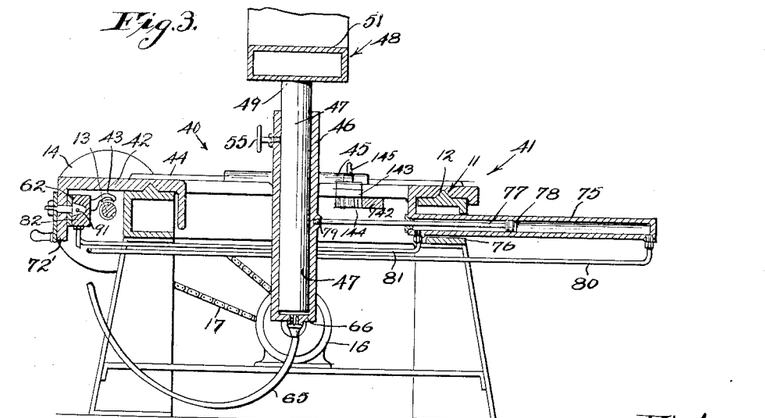
Fig. 3 is a vertical transverse section on the line 3—3 of Figs. 1 and 2 in the direction of the arrows, showing the mechanism for shifting the camera laterally and vertically.

The transverse movement of the cylinder and thereby the camera is obtained by a second cylinder 75 which is rigidly attached to the camera table 42 and extends through a slot 76 in the bed of the machine. This cylinder has a plunger 77 therein with a piston 78, the plunger being connected to the cylinder as indicated at 79. A pipe 80 connects from the far end of the cylinder and a pipe 81 to the inner end (Fig. 3). This cylinder and piston may be controlled by any suitable valve, that illustrated being designated by the numeral 82 (see Figs. 5 and 6). This valve has a casing 83 with an inlet 84 from the storage tank, and this casing has a duct 85 connected to the inlet, a duct 86 connected to the pipe 80, another duct 87 connected to the pipe 81, ducts 88 and 89 connecting to drain pipes 90. The valve has a valve plug 91 controlled by a handle 92 on the front of the apron 72' and in this plug there are ports 93, 94 and 95.

The manner of operation is as follows: When a plug is turned so that the ports 93 and 94 register with the ducts 85 and 86, respectively, the hydraulic fluid is forced through the pipe 80 to the rear end of the cylinder, and thus shifts the cylinder 46 and camera towards the front of the bed; and at the same time the port 95 registers with the duct 89 and allows draining of the fluid in the front of the cylinder 75 back to the reservoir.

Figures 4, 6:
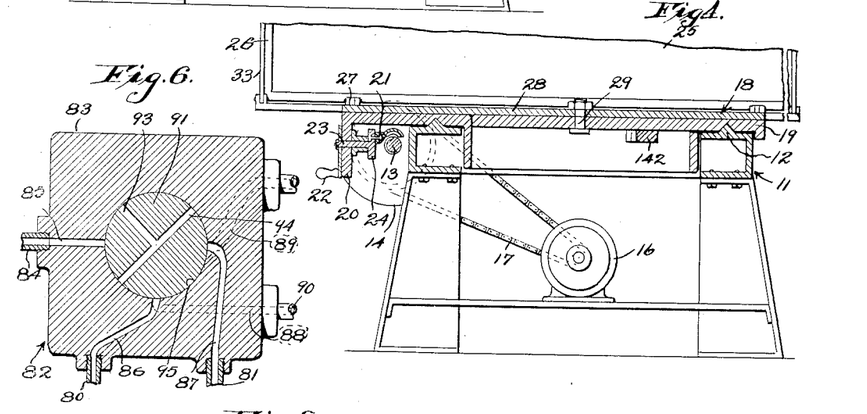
Fig. 4 is a section on the line 4—4 of Figs. 1 and 2 in the direction of the arrows, showing the carriage for the screen.
Fig. 6 is an enlarged section of one of the valves shown in Fig. 5.

When the plug 91 is turned to the position shown in Fig. 6 the camera is held stationary. When it is turned with the port 94 registering with the ducts 85 and 87, the hydraulic fluid passes through the pipe 81 to the front of the cylinder 75, and at the same time there is a drain from the port 95 to the duct 88, back to the reservoir. It will be seen that by this mechanism the camera may be readily shifted transversely of the bed.

The projector, designated generally by the numeral 100, is mounted on a structure substantially identical with that of the camera, the plunger 101 being connected solidly to the base 102 of the projector. The projector may have longitudinal travel on the bed by means of the screw 13 and may be raised and lowered by means of the vertical cylinder and moved transversely by means of the horizontal cylinder. It may also be rotated on the vertical axis of the plunger 101 when desired.

In order to obtain a synchronism in the projector and camera, I preferably utilize an electric motor 105 having fixed shafts 106 and 107 and flexible shafts 108 and 109, these latter leading to the projector and to the camera, respectively. Therefore, the rotary motion of the motor functions to operate the shutter and film shifter in both the projector and camera in synchronism.

In order to obtain quick focusing of the camera lens for making dissolves, etc., I prefer to utilize a lens 110 which is coupled with a finder 111 so that these will function together. For purposes of illustration this may be in accordance with my method and means for making dissolves and effects in motion pictures, Patent No. 1,813,428, issued July 7, 1931. In addition to this, in order to obtain fog effects or fade-outs, changing color effects, distortions, etc., I may utilize an equipment 112 mounted on supports 113 on the front of the camera. Such equipment may be somewhat as set forth in my patent application for method and means for making effects for motion pictures, Serial No. 225,162. In order to obtain a variation in the intensity of the light in the projector, I preferably use a rheostat, indicated diagrammatically by the numeral 114, connected by a lead wire 115 to the projector. In moving the screen relative to the projector as hereunder mentioned, it is desirable to increase or decrease the intensity of the light so that the picture on the screen will have the same degree of illumination regardless of the position of the screen to the projector.

Figure 11:
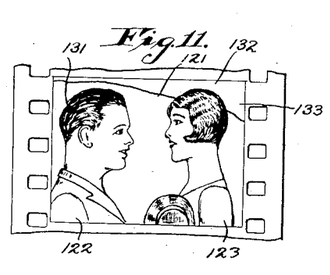
Fig. 11 is a close-up view of the two actors and of a different section of the film.
Figure 12:
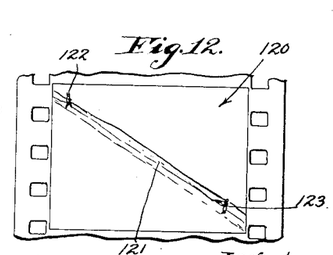
Fig. 12 is a section of a film showing a frame of the long shot.

In order to illustrate the method of using my invention I present sketches, Figs. 8 through 12, showing different stages in the development of a picture. Fig. 12 is a view of a single frame of one of the parts of the general or long shot. This general or long shot is indicated by the numeral 120, in which there is indicated the profile of a hill 121 with a figure of a man 122 at the top of the hill and a figure of a woman 123 at the bottom of the hill. It is presumed that the woman and man are walking towards each other and meet about midway of the hill, and in such meeting exchange greetings. It is also presumed that in first noticing each other there is some expression of recognition which it is desired to register in larger pictures than the long shot, in a manner hereunder set forth.

Figure 8:
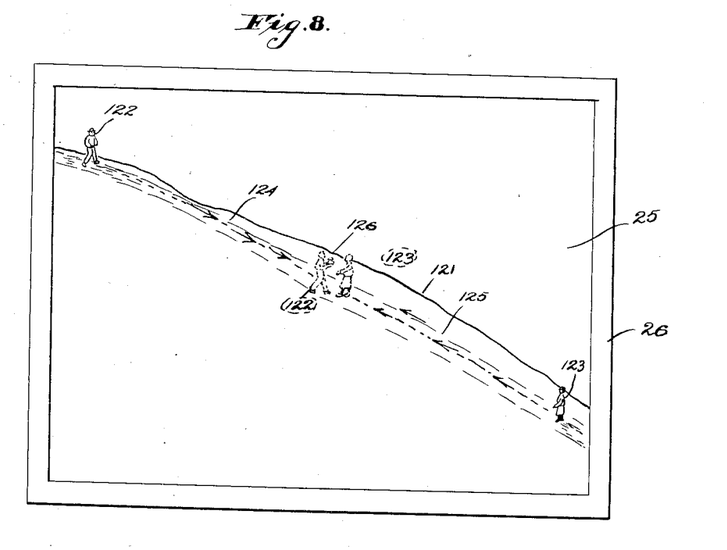
Fig. 8 is an elevation of the screen showing a long shot picture projected thereon and indicating movements of certain of the actors in dotted lines.
Figure 9:
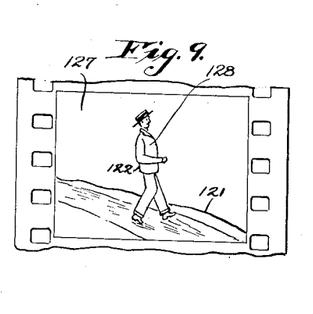
Fig. 9 is a section of a film showing a single frame with an enlarged view of one of the actors.
Figure 10:
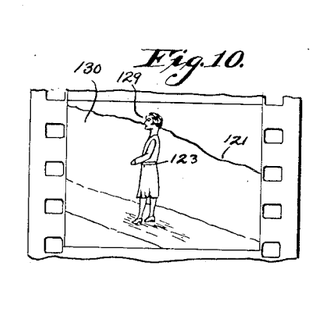
Fig. 10 is a view similar to Fig. 8 showing a similarly enlarged view of the other actor.

The basic film or long shot after development is placed in the projector and projected on the screen 25, manifestly being much enlarged, and in practice, very much enlarged over the relative difference in the frame of Fig. 12 and the size of the screen shown in Fig. 8. In Fig. 8 the direction of movement of the actors is indicated by the dotted lines 124 for the man, the dotted lines having arrows, and 125 for the woman, also in dotted lines. They are indicated at their meeting position 126. It will be understood that if desired this film may be run through on the screen from the projector without using the camera, in order to inspect such picture and ascertain the suitable parts for enlarging to give medium shots and close-ups.

It is presumed that it is desired to give a medium shot of the two actors when they first recognize each other, this being on such a scale that the figures will occupy practically the full height of the frame. Therefore, the screen 25 is placed at such a position relative to the projector 100 and the camera 40 that when the camera is focused on the picture of the man being projected, such picture would occupy the desired portion of the frame in such camera; then when the projector and camera are connected together to operate in synchronism, a medium shot, indicated by the number 127, is taken of the man, and as indicated, the figure 128 of the man occupies substantially the whole height of the frame. It will therefore be manifest that the picture of the man in Fig. 12 and Fig. 9 has been magnified or enlarged some ten times or more, and this is sufficient to clearly register the individual action of the actor and the facial expression to a certain extent when it is presumed that he first notices the woman actor.

When taking this enlargement of the man as this is presumed to be as he first starts down the hill, on the upper left hand corner of the screen, as shown in Fig. 8, it is desirable to move the camera to the back part of the frame and also to elevate it so that the camera is photographing at right angles to the screen and, as the actor moves partway down the hill, it is desirable to move the camera transversely towards the front and gradually lower it in a combined motion. Of course if desired a free head movement of the camera may be utilized but this would give an angular view of the actor instead of a strict and accurate enlargement of the figure 122 of Fig. 12.

Presuming it is also desired to obtain a picture of the woman of substantially the same size as that of the man and at the bottom of the hill, the basic film is started through the projector again and as the woman is illustrated at the lower right hand side of the screen, the camera is moved to the front of the bed and lowered so that it is taking a picture substantially at right angles to the screen and being focused to take in substantially only the part illustrating the woman on the full size of a frame. In this instance the figure of the woman is indicated by the numeral 129 and she occupies substantially the full height of the frame 130 when photographed by the camera; and as she is indicated as walking up hill in the direction of the dotted lines and arrows 125, the camera is moved towards the back of the bed and at the same time elevated, keeping the lens focused on the figure of the woman and at right angles to the screen. It is manifest that a sufficient length of film may be taken of these two medium shots of Figs. 9 and 10 to register the action desired, which is presumed to be the first noticing of each other and the expression indicated.

It is presumed that it is desired to have a close-up illustrating the greeting of the man and the woman when they meet, and as indicated dotted in Fig. 8 at 126, they are presumed to meet about half way the length of the hill. To obtain this effect the screen 26 may be placed closer to the camera if desired than in the medium shots, so that in the picture projected on the screen the actors will be on a larger scale than shown in Fig. 8; and in fact the enlargement may be so great that the complete hillside cannot be taken in, that is, the actors at the top and the foot of the hill would not be shown in the running of the basic film; or any other manner by change of lenses in the camera or projector may be utilized so that when the camera is focused on the screen and takes a picture of the man and woman as they closely approach and meet, this will be on the desired large scale.

Such a close-up is indicated in Fig. 11 in which it will be seen that the figure of the man 131 and of the woman 132 substantially only shows the upper half of the body and the head in a good sized enlargement, such part of the photograph occupying substantially the whole height of the frame 133.

It will be seen, therefore, referring to the original basic frame 120 that the close-up enlargement of Fig. 11 may be some twenty times or more as great, and this closeup shows the faces sufficiently large to register the expression of greeting when they meet each other. It is to be understood that the various degrees of enlargement which may be made depends to a great extent on the clearness and sharpness of the original basic picture which has been taken. In this basic picture the actors should go through all the actions and register all the emotions which it is desired to show in medium shots and in close-ups. Hence, by the simple illustration given, which is presumed to show one scene from a full continuous picture, by merely taking a basic film, various enlargements of parts may be made showing the desired number of intermediate pictures ranging from a large close-up to the basic picture.

As above mentioned, my apparatus and method may be utilized to make dissolves and various other effects in motion pictures by using as basic films straight pictures without any such effects. For instance, in making a dissolve a basic large picture could be projected on the screen and the camera focused on a certain particular action thereof, and this could be dissolved out, in accordance with the arrangement set forth in my Patent No. 1,813,428 above mentioned; and then the basic film could be changed for another film and another picture merged on the film in the camera.

Again, presuming it is desired to make fog effects from a clear picture, the apparatus disclosed therefor in my patent application, Serial No. 225,162, could be used for this purpose, while a basic film without any such effect is being thrown on the screen and the camera picking out certain parts of this. The same apparatus may also be used for securing twilight and fadeout effects, making distortions, and any of the other features mentioned in the patent application noted above.

When it is desired to run the projector and camera at different speeds, as is sometimes desirable, I utilize gear boxes 140 and 141 which are coupled in the shafts 106 and 107 driven by the motor 105. These are located so that the speeds can be arranged in multiple, that is, the speed of the camera may be twice or even a greater multiple of the speed of the projector, or vice versa.

When desirable I may make provision for automatically changing the focus of the lens on the projector and on the camera in accordance with the movement of the screen to and from either of these appliances, as the automatic equipment makes it unnecessary to adjust the lenses by hand. To effect this arrangement I provide a longitudinal rack 142 which is fixedly connected to the screen table 19 and projects in both directions therefrom. This rack, therefore, has a sliding motion longitudinally of the bed, when the screen table is moved in either direction thereon.

Figure 13:
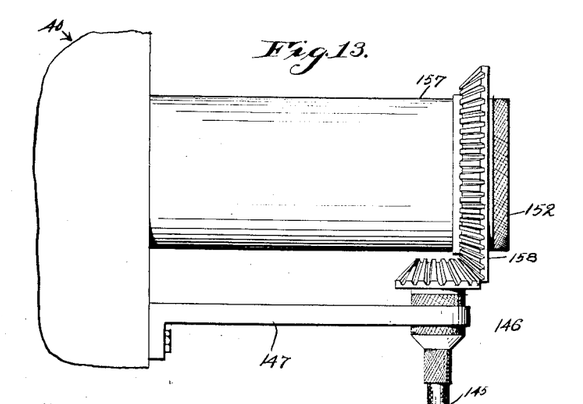
Fig. 13 is a side elevation of a lens of the camera or projector showing an arrangement for changing the focus in accordance with the movement of the screen to and from the projector or camera.
Figure 14:
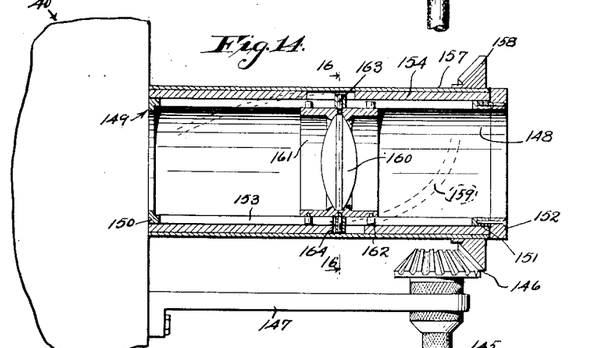
Fig. 14 is a vertical longitudinal section on the line 14—14 of Fig. 16 in the direction of the arrows.
Figure 15:
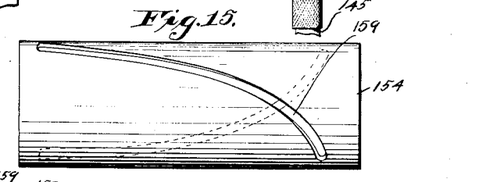
Fig. 15 is a side view of the revolving cam sleeve used to change the focus.
Figure 16:
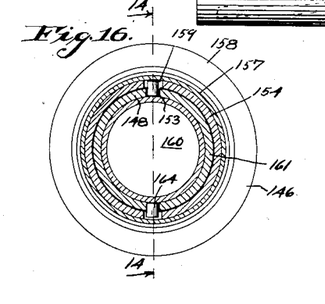
Fig. 16 is a vertical transverse section on the line 16—16 of Fig. 14 in the direction of the arrows.

Connected to each of the tables carrying the projector or the camera there is a gear box 143 carrying a pinion 144 which meshes with the rack, and this pinion drives a flexible shaft 145, and by means of a gear train 146 supported on a bracket 147 connected to the camera and also to the projector the shifting motion is conveyed to the lens (note Figs. 1, 2 and 13).

The detail construction of the shiftable lens is illustrated particularly in Figs. 13 through 16. This illustrates an inner sleeve 148 having a rigid connection 149 to either of the motion picture apparatus above mentioned, the sleeve having a ring 150 at the inner end, and also an outer ring 151 rigidly connected thereto. A cap ring 152 is secured to the ring 151 by screws or the like. The inner sleeve has a pair of longitudinal slots 153, these being preferably diametrically opposite.

The outer rotary sleeve 154 is mounted on the inner sleeve, being retained in position at each end by the rings 150 and 152, and driven through the medium of the outer cover sleeve 157. The sleeve 157 is rigidly connected to the gear 158 and forms a means for excluding light from the lens. The rotary sleeve 154 has cam slots 159, of which two are illustrated. These slots are of such shape as to give the lens the proper motion, as hereunder set forth.

The lens 160 is mounted in a lens holder 161 which preferably has a series of four small rollers 162 engaging in each of the longitudinal slots 153. It also has projecting studs 163 with rollers 164 thereon, these rollers engaging in the slots 159 of the rotary sleeve. Therefore, it will be seen that when the cover sleeve 157 and the sleeve 154 are rotated, that as the rollers 164 follow in the cam slots 159 the lens is moved longitudinally in relation to the slots 153 and is moved different amounts according to different positions of the screen, relative to the lens, on account of the particular shape of the cam slots 159.

These slots must be made with accuracy, having reference to the particular position of the screen in reference to the lens, either of the projector or camera, so that the lenses will be moved to project a clear image on the screen and also to photograph with a clear image. As a rule the sleeve 154 does not make a complete rotation, but only a partial rotation in shifting the lens the desired distance, and hence a connecting link 165 may be utilized connecting the lens 110 of the camera and the lens 111 of the finder, this being a modification of the procedure in my Patent No. 1,813,428 above mentioned. It is also to be understood that the finder may be adjusted angularly in reference to the axis of the lens as is known in connection with certain types of moving picture cameras.

Figure 7:
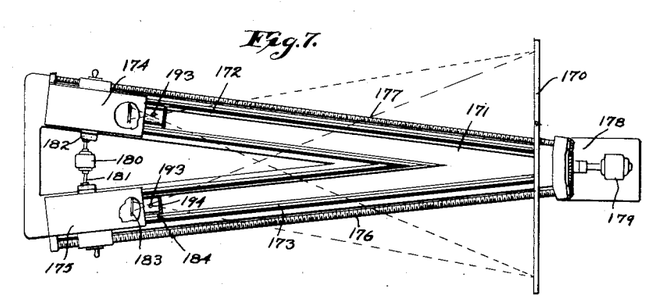
Fig. 7 is a diagrammatic plan of an alternative apparatus using a reflecting screen for the projection printer.

It is at times desirable to use a reflecting system of projection and photography instead of using a translucent screen. Such an arrangement is illustrated in Fig. 7 in which the screen 170 is illustrated as being fixed on one end of a bed 171 having diverging tracks 172 and 173. On one of these tracks there is positioned a projector 174 and on the other camera 175. These may be shifted longitudinally of the bed by means of shifting screws 176 and 177 operated by a gear train 178 driven by an electric motor 179, these instruments being coupled to the shaft in the same manner as illustrated in Figs. 1 through 6. In this construction also the projector and camera may be raised and lowered by the hydraulic or other equivalent arrangement as shown in Figs. 1 through 6; and they may be driven by an electric motor 180 through flexible shafts 181, there being variable speed gears 182 connected to the camera and to the projector to allow a difference of speed between the projector and camera.

In order that the images as projected by the projector and photographed by the camera are not distorted, the aperture plate 183 in each of these instruments is placed parallel to the screen. Therefore the film in both the projector and the camera is parallel to the screen, hence the angularity of the incident path of light centrally from the projector and centrally to the camera is compensated, and the features on the edges of the pictures do not show distortion.

As the projector and the camera may be moved to and from the screen to secure various effects, in much the same manner as with the translucent screen, yet these cannot be positioned where one would block the light from the other, either in projecting on the screen or in photography. Therefore, I utilize preferably in the camera a variable focus lens 184.

Figures 17, 17A, 18:
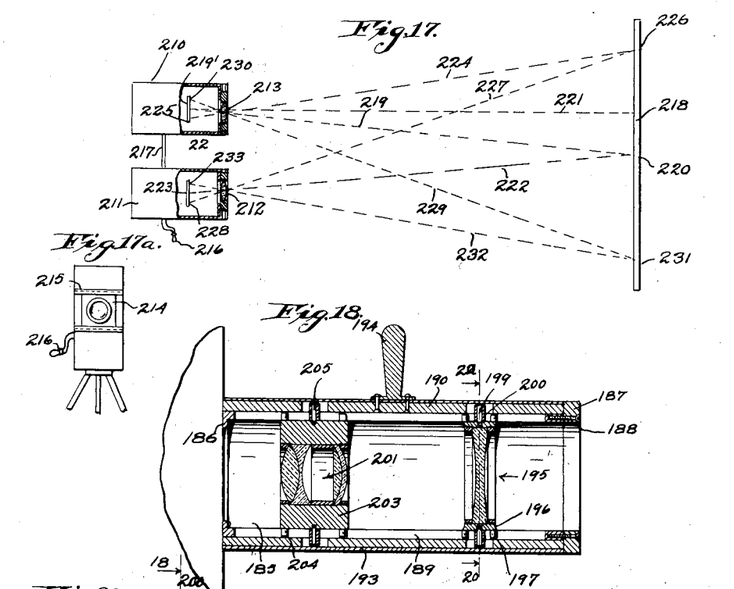
Figure 19:
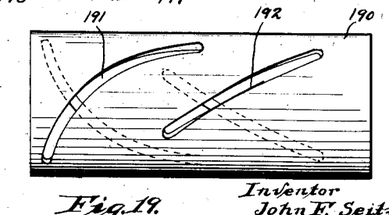
Fig. 19 is a side view of the cam sleeve for shifting simultaneously the two groups of lens to obtain the variable focus.
Figure 20:
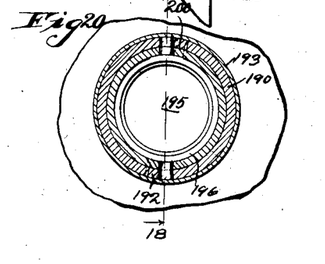
Fig. 20 is a vertical section substantially on the line 20—20 of Fig. 18.

The details of the lens are shown particularly in Figs. 18 through 20, such lens being designated by the numeral 184; this has an inner fixed sleeve 185 which is secured to the front of the camera or the projector, there being a flange 186 securing these parts together. A ring 187 is secured to the outer end of the fixed sleeve having screws 188 threaded therein. This fixed sleeve has a pair of longitudinal straight slots 189. A rotary sleeve 190 is mounted on the fixed sleeve and has a rearward set and a forward set of cam slots 191 and 192. Outside of the sleeve 190 there is a cover sleeve 193 fixedly secured thereto and having a handle 194. This sleeve forms a light-tight closure over the cam slots.

The outer or distance lens 195 is mounted in a lens holder 196 having a plurality of rollers 197 engaging in the straight slots 189 of the inner fixed sleeve. The holder also has a pair of studs 199 projecting outwardly therefrom and having rollers 200 thereon; these rollers engage in the outer cam slots 192. The inner set of lenses 201 are also mounted in the lens holder 203 and have a plurality of studs or rollers 204 slidable in the straight slots 189 and have pins with rollers 205 extending outwardly therefrom and operating in the inner cam slots 191.

The manner of operation of the variable focus lens as illustrated is designed to be manually controlled by giving the handle 194 a rotary motion relative to the axis of the lenses and in so doing, the pins connected to each of the lens holders and engaging in these slots are forced to follow the path of the two sets of cam grooves. On account of the shape of these grooves, this changes the relative distance apart of the inner and outer lenses; but it is to be noted that the lenses do not rotate about their axis, therefore there is no shifting of the image on the film, which would probably be caused if the lenses themselves rotated.

Reverting to the operation of the apparatus as shown in Figs. 1 and 2, it will be seen that when the lenses are connected to be automatically altered in focus in accordance with the relative motion of the screen and either the projector or the camera, that it is not necessary for an attendant to manually alter the focus; but it is to be understood that if desired a more simple construction than that illustrated could be used in which the screen, the projector and camera could be manually shifted towards and from each other, and the lenses manually controlled. And if desired the projector and camera could be shifted, vertically and moved laterally relative to each other, manually.

The reflecting system of making pictures is adaptable to substantially all procedures and making the same types of picture as described in connection with Figs. 1 and 2; and as above mentioned, either the projector and camera may be moved either to or from the screen, and may be raised vertically and shifted laterally. It is desirable, however, in this case that the lens of the camera, for certain types of work, be the variable focus lens as illustrated in Figs. 18 through 20. A feature of the angular projecting and photography is the use of the aperture plate and film parallel to the screen.

In Fig. 17 I show a type of projector and camera printer in which the aperture plate and films of the projector and camera are both parallel to the screen and the plane of the lenses is parallel to the screen, this making the axis of the lenses perpendicular to the screen; but the lenses are shiftable laterally in reference to each other so that the image as projected on the screen is positioned to one side of the center line which is perpendicular or normal to the film and to the screen. The lens of the camera is also shiftable laterally so that the film in the camera will receive light from the desired parts of the picture as projected.

In this illustration the projector is designated by the numeral 210 and the camera by the numeral 211, each of these having aperture plates 212 behind which is situated a film; and each has a lens 213 mounted in a slidable lens holder 214 mounted in a transverse guide 215 on the camera and projector. For simplicity's sake the combined unit is illustrated as being driven by a crank 216 with a shaft 217 connecting the camera and the projector to operate these in synchronism. The screen is designated by the numeral 218.

The manner of functioning of the projection and camera printer as above described is substantially as follows: The lens mounting or holder on the projector is shifted towards the camera so that the central ray of light 219 from the center 219' of the film being projected through the lens is incident on the screen at a point 220 which is usually about half way between the projector and the camera; that is, it is to one side of the line indicated at 221, which is perpendicular or normal to both the film and the screen.

The camera is focused so that the reflected ray of light 222 from the point 220 on the screen passes through the lens and is re-received centrally on the film, as indicated at 223. Due to the reversal of the image by the lens, the ray of light 224 from the right-hand side 225 of the film being projected is incident on the screen at the point 226, and the reflected ray 227 passing through the center of the shifted lens of the camera forms an image 228 on the right hand side of the film in the camera. Likewise, the incident ray 229 from the left hand side 230 of the projected film in passing through the lens is incident at the point 231 on the screen and its reflected ray 232 forms an image at 233 on the film in the camera.

Likewise the rays of light in a vertical plane are crossed over and the image in the camera is in exact register with the image projected on the screen by using the lenses shiftable towards and from each other. This type of projection reflecting printer can be used in the same manner as the reflecting printer of Fig. 7.

An important feature of my invention, particularly in the translucent screen type with the camera on one side and the projector on the other, is that the screen may be moved to and from either of these instruments; this allows the obtaining of a number of different effects, which is desirable. For instance, if the screen is moved from the projector, the picture becomes enlarged on the screen and the enlargement is taken by the camera; and by the opposite action the picture may be caused to diminish. Substantially the same effects may be obtained by using the lens of variable focal length in the reflecting type of projection printer.

Another important improvement of my invention is the special attachment for maintaining the proper focus of the lenses of the projector and the camera, regardless of their position relative to the screen or the relative movement of the screen and the projector and camera.

In the claims where I have used the term "basic picture" I mean the picture which is utilized as the basis for forming the secondary pictures, whether these be enlargements or reductions, and various other changes and effects. This is the picture taken by the camera from which the other pictures of the sequence are formed.

My invention is of considerable advantage in use in connection with talking moving pictures. In taking these, the present practice where the actors do the speaking, is to set up a number of cameras at different distances from the actors in order to take a general view of the general setting and close up. In the prior procedure frequently these were done in separate actions. With my procedure with one camera the general setting may be taken and the close ups rephotographed from the general projected picture.

Various changes may be made in the principles of my invention without departing from the spirit thereof, as set forth in the description, drawings and claims.

I claim:

1. The method of making a sequence of motion pictures comprising using a film having a basic picture, projecting the basic picture on a screen on one scale, photographing on another scale an action or actions of the basic picture from the projection on the screen on a film or films and in such photography following the particular action or actions depicted in the basic projected picture to the exclusion of the other portions of such basic picture, printing the photographs, and using the film having the basic picture and the films having the photograph or photographs taken therefrom in a sequence.

2. The method of making a sequence in motion pictures comprising utilizing a basic film, projecting a basic picture on a screen from such film on a first scale, photographing a first part of such picture from the projection on the screen on a second and larger scale to the exclusion of other parts, photographing part of such basic projected picture from the projection on the screen on a third and still larger scale to the exclusion of the other parts, printing the films, and utilizing the basic film and the other films produced therefrom on different scales in a sequence.

3. The method of making a sequence in motion pictures comprising utilizing a basic film and projecting a basic picture therefrom on a screen on a first scale, making a first photograph on a film of an action on the basic picture from the projection on the screen to the exclusion of other parts projected and on a desired second and different scale, making a second photograph of the same action on another film on a still larger scale to the exclusion of the other parts of the basic picture from the projection on the screen, printing such photographed films, and utilizing the basic film and the first and second enlargements of parts thereof in a sequence.

4. The method of making motion pictures comprising projecting a picture from a basic film on a screen on a relatively small scale, photographing on a relatively larger scale a particular projected action to the exclusion of other features of the basic picture from the projection on the screen on a film and at the same time following such action in its movement on the screen, printing the film photographed, and utilizing such film in a motion picture.

5. The method of making motion pictures comprising projecting a basic picture from a basic film on a screen on a relatively small scale, photographing from the screen a particular projected action on a relatively larger scale to the exclusion of other features on a film, at the same time following such action on the screen, said photography being substantially at a constant angle to the screen, printing the film, and utilizing the photographed film in a motion picture.

6. The method of making motion pictures comprising projecting a basic picture on a screen on a first scale from a basic film, photographing from the projection on the screen a particular projected action to the exclusion of other features on a film on a second scale, making a second photograph from the projection on the screen on another film of a particular action to the exclusion of other parts of other features on a third scale, printing the films photographed, and utilizing such printed films in sequences in a motion picture.

7. The method of making motion pictures comprising projecting a basic picture from a basic film on a screen on a first scale, photographing on a second and different scale on a film a part or parts of the basic picture from the projection on the screen to the exclusion of other parts and changing the effects produced on the photographed film from the picture as projected on the screen, printing the films having the photographed picture or pictures, and utilizing such films in a motion picture sequence.

8. The method of making motion pictures comprising projecting a basic picture from a basic film on a screen, photographing from the screen a part or parts of such basic picture on a film and at the same time having a relative motion between the screen and the instrument projecting the basic picture and the camera photographing, printing the film or films photographed, and utilizing such films in a motion picture.

9. The method of making a sequence of motion pictures comprising utilizing a film having a basic picture thereon, projecting such picture on a screen on a relatively small scale, moving said screen away from the projector to secure an enlargement of the basic picture, photographing from the screen all or part of this enlarged basic picture on a film or films during such movement, printing the films photographed, and uniting the basic film and the films produced from the picture thereon into a sequence.

10. An apparatus for making motion pictures comprising a screen, a projector and a camera having lenses, means to effect a motion of the screen in relation to the camera and projector, a lens shifting means controlled by such relative motion to vary the focus of the lens of either or both the projector or camera to keep such lens in constant sharp focus relative to the screen, regardless of movement and position of such screen and projector or camera.

11. An apparatus for making motion pictures comprising a projector and camera having lenses, a screen, aperture plates to position films parallel to the screen, the plane of the lenses being parallel to the screen, and means to shift the lenses laterally in such planes whereby a picture projected by the projector on the screen may form an image in the camera aligned in the desired position on the film.

12. The method of making moving pictures comprising utilizing a basic picture film having actions shifted from one place to the other on the film, projecting such picture on a first scale, photographing on a second and different scale from the projection, the part of the actions which shift on the basic picture projected, to the exclusion of other parts.

13. The method of making moving pictures comprising utilizing a basic picture film, projecting said picture on a screen on a first scale, the projected picture having actions shifting from one part to another on the film, photographing on a second and different scale from the projection such action to the exclusion of other parts of the basic picture.

14. The method of making a sequence of motion pictures comprising utilizing a film having a basic picture thereon and projecting such picture on a screen, photographing on a film a part or parts of such picture from the projection on the screen and following any shifting of position of said part or parts on the screen, printing the film, and using the basic film and the films having the part or parts to form a sequence.

15. The method of making a sequence of motion pictures comprising utilizing a film having a basic picture thereon, projecting such picture on a screen, photographing and printing on a film or films a part or parts of the basic picture from the projection on the screen and following any shifting of position of such part or parts on the screen, and uniting the basic film and the film or films having the parts thereof into a sequence.

16. The method of making a sequence of motion pictures comprising utilizing a film having a basic picture thereon, projecting such picture on a screen on one scale, photographing on a film or films on another scale a part or parts only of the basic picture from the projection on the screen and following any shifting of position of such part or parts on the screen to the exclusion of the remaining portion of the basic picture, printing the films photographed, and uniting the basic film and the films produced from the picture thereon into a sequence.

In testimony whereof I have signed my name to this specification.

JOHN F. SEITZ.